US009549286B2

(12) United States Patent
Birch et al.

(10) Patent No.: US 9,549,286 B2
(45) Date of Patent: Jan. 17, 2017

(54) GEO-FENCE NOTIFICATION MANAGEMENT

(71) Applicant: INTEL CORPORATION, Santa Clara, CA (US)

(72) Inventors: Thomas A. Birch, Portland, OR (US); Derick Arnold Johnson, Folsom, CA (US); Michael J. Kasper, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/122,040

(22) PCT Filed: Sep. 20, 2013

(86) PCT No.: PCT/US2013/060920
§ 371 (c)(1),
(2) Date: Nov. 25, 2013

(87) PCT Pub. No.: WO2014/130090
PCT Pub. Date: Aug. 28, 2014

(65) Prior Publication Data
US 2015/0350827 A1  Dec. 3, 2015

Related U.S. Application Data

(60) Provisional application No. 61/768,156, filed on Feb. 22, 2013, provisional application No. 61/768,203, filed on Feb. 22, 2013.

(51) Int. Cl.
*H04W 24/00* (2009.01)
*H04W 4/02* (2009.01)
*H04W 8/04* (2009.01)

(52) U.S. Cl.
CPC ............... *H04W 4/021* (2013.01); *H04W 4/02* (2013.01); *H04W 8/04* (2013.01)

(58) Field of Classification Search
CPC ........... H04W 4/021; H04W 4/02; H04W 8/04
See application file for complete search history.

(56) References Cited

U.S. PATENT DOCUMENTS

2008/0032703 A1\* 2/2008 Krumm ................... H04W 4/02
455/456.1
2008/0162034 A1    7/2008 Breen
(Continued)

FOREIGN PATENT DOCUMENTS

| KR | 1020150100781 A | 9/2015 |
| WO | WO-2013006654 A2 | 1/2013 |
| WO | WO-2014130090 A1 | 8/2014 |

OTHER PUBLICATIONS

"International Application Serial No. PCT/US2013/060920, International Preliminary Report on Patentability mailed Sep. 3, 2015", 10 pgs.

(Continued)

*Primary Examiner* — Lester Kincaid
*Assistant Examiner* — William Wang
(74) *Attorney, Agent, or Firm* — Schwegman Lundberg & Woessner, P.A.

(57) ABSTRACT

Embodiments for geo-fence notification management are generally described herein. A mobile device for geo-fence notification management may include a geo-location module to: determine a geographical location of the mobile device; and determine whether the mobile device is located in a geo-fenced area for longer than a threshold period of time; and a presentation module to present a notification on the mobile device when the mobile device is located in the geo-fenced area for longer than the threshold period of time. A server and mobile device may work cooperatively to (Continued)

obtain a position of a mobile device; determine whether the mobile device is located in a geo-fenced area; determine whether the geo-fenced area has a software application associated with it; and present the software application to the mobile device when the geo-fenced area has a software application associated with it.

10 Claims, 8 Drawing Sheets

(56) References Cited

U.S. PATENT DOCUMENTS

| | | | |
|---|---|---|---|
| 2008/0248815 A1* | 10/2008 | Busch | H04W 4/02 455/456.5 |
| 2009/0063187 A1* | 3/2009 | Johnson | A61B 5/0022 705/2 |
| 2010/0127919 A1 | 5/2010 | Curran et al. | |
| 2011/0010672 A1* | 1/2011 | Hope | G06F 3/04817 715/841 |
| 2011/0208797 A1 | 8/2011 | Kim | |
| 2011/0306304 A1 | 12/2011 | Forutanpour et al. | |
| 2012/0084352 A1* | 4/2012 | Cho | G06F 21/53 709/203 |
| 2012/0302258 A1* | 11/2012 | Pai | H04W 4/02 455/456.2 |
| 2013/0031169 A1* | 1/2013 | Axelrod | H04L 67/306 709/204 |
| 2013/0031598 A1* | 1/2013 | Whelan | G01S 1/725 726/1 |
| 2013/0045729 A1* | 2/2013 | Haik | H04W 4/001 455/418 |
| 2013/0045753 A1* | 2/2013 | Obermeyer | G08B 21/0277 455/456.1 |

OTHER PUBLICATIONS

"International Application Serial No. PCT/US2013/060920, International Search Report mailed Dec. 30, 2013", 3 pgs.

"International Application Serial No. PCT/US2013/060920, Written Opinion mailed Dec. 30, 2013", 8 pgs.

"European Application Serial No. 13875342.1, Extended European Search Report mailed Sep. 13, 2016", 8 pgs.

Amie. Greenwald, et al., "An economically viable solution to geofencing for mass-market applications", Bell Labs Technical Journal, Wiley, CA, US,vol. 16, No. 2,.XP001569622, (Sep. 1, 2011), 21-38.

* cited by examiner

GEO-FENCE NOTIFICATION MANAGEMENT

CLAIM OF PRIORITY

This patent application is a U.S. National Stage Filing under 35 U.S.C. 371 from International Application No. PCT/US2013/060920, filed on Sep. 20, 2013; which claims the benefit of U.S. Provisional Patent Application Ser. No. 61/768,156, titled "GEOAPP IN-ZONE DELAY," filed Feb. 22, 2013, and U.S. Provisional Patent Application Ser. No. 61/768,203, titled "GEO-SENSITIVE FOLDER," filed on Feb. 22, 2013, each of which is hereby incorporated by reference in their entireties.

TECHNICAL FIELD

Embodiments described herein generally relate to geo-fence technology and in particular, to geo-fence notification management.

BACKGROUND

The widespread availability of multi-functional mobile devices has resulted in having these devices as an integral medium for everyday activities. Mobile devices are capable of displaying maps, using position sensing technologies (e.g., global positioning system (GPS)), and providing alerts via text, graphics, audio, and the like.

A geo-fence is a virtual boundary around a geographic location. When a location-aware mobile device enters or exits a geo-fenced area, various actions may occur, such as presenting a notification on the mobile device. Geo-fences are used in a variety of applications, including security, insurance, and recreation.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
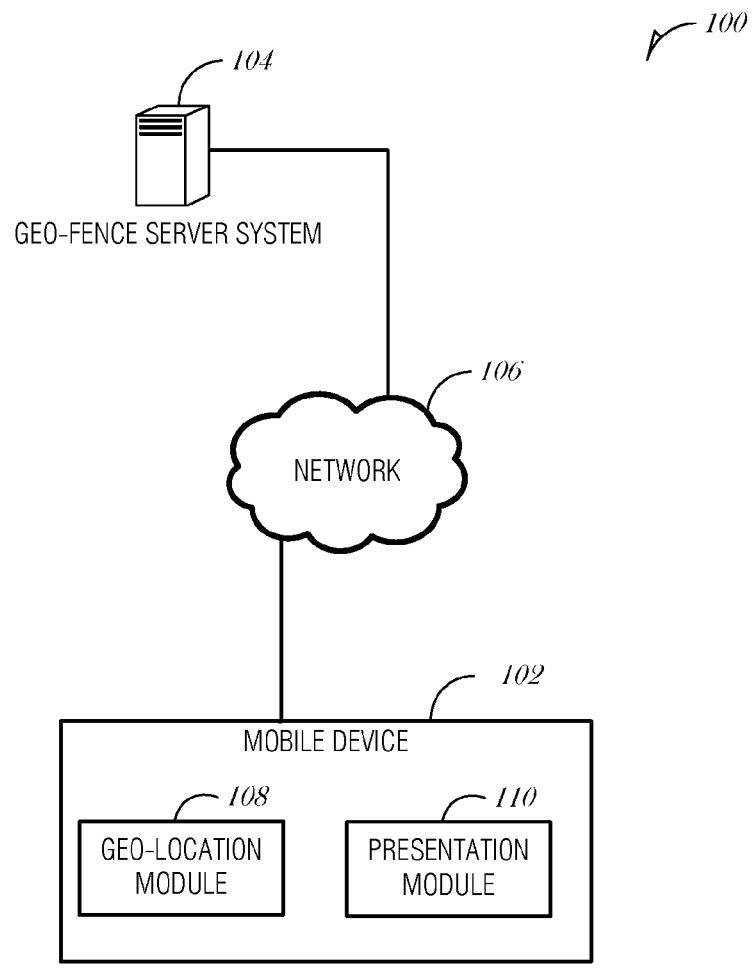
FIG. 1 is a schematic drawing illustrating a geo-fence system, according to an embodiment.

As people increasingly rely on mobile devices in their day-to-day lives, creating and managing location-based applications while on the move, such as from a mobile device is becoming more important. One useful technology for location-based applications is geo-fencing. Geo-fencing includes creating and managing a geo-fence, which is a virtual boundary of a geographical area. A geo-fence may be considered an object (e.g., a geo-fence object), such that the geo-fence may have various properties like objects in other disciplines, such as object-oriented programming. In this way, a geo-fence object may include attributes and functions.

Attributes may include data, such as a name, unique identifier, coordinates defining the geo-fence (e.g., a latitude/longitude, altitude, or a relative coordinate system), an active and expiration date/time, permissions, and the like. In an embodiment, a geo-fence may be defined in three-dimensional space. In such an embodiment, one floor of a skyscraper may be fenced, for example. Other various embodiments may geo-fence airplanes, mountains, tall buildings, subways, or spacecraft, using three-dimensional geo-fences.

Functions may include actions such as notifications on entry/exit of a geo-fence, application download or initiation upon entry/exit, or other actions that occur on a user's mobile device or are caused to occur on another device associated with the user or on another user's device.

For example, a geo-fence may have attributes such as a name, "Memorial Day Sale" and a location, e.g., situated to enclose a store location at a mall. The geo-fence may have a beginning date of midnight, May 25, 2013 and an expiration date of midnight, May 28, 2013. The "Memorial Day Sale" geo-fence may have functions associated with it such that when a user enters the geo-fence a coupon notification is pushed to the user's device. The coupon notification may include a mechanism that allows the user to navigate to a web page (e.g., embedded web link), which displays a coupon for the Memorial Day Sale at the store.

As geo-fencing becomes more prevalent, the number of geo-fences will increase and the number of geo-fence notifications will similarly increase. Additionally, two or more geo-fences may overlap, thereby compounding the sheer number of geo-fences that a user may be within. As a result, a user entering or exiting a geo-fenced area with the potential of multiple overlapping geo-fences, may be inundated with alerts or notifications. If a user moves and crosses geo-fenced areas quickly, such as in a vehicle, the notifications may queue up on the user's device, but may not be relevant anymore to the user. In addition to notifications, a geo-fence function may be to initiate an application download or enable an application already installed on a user device. Thus, what is needed is a mechanism to manage alerts, notifications, and applications as users enter or exit geo-fenced areas.

To address the issues of alert, notification, or application management in a plurality of geo-fences, a delay mechanism or a geo-fence-aware application folder may be used. The individual or combined use of these concepts may prevent, for example, user over-notification and fatigue.

Geo-fence notifications are understood to include alerts, notifications, queries, or other prompts that are provide to a user via a user device. The notifications may be communicated with audio cues, visual cues, cues tactile (e.g., vibration), or combinations thereof. Many mobile devices include a notification interface, such as a drop down screen that includes pending or unacknowledged notifications (e.g., notifications in queue).

As noted above, a delay mechanism may be used to address excessive activity caused by overlapping geo-fences. Generally, when a user enters a geo-fence having a notification associated with it, the notification is not presented to the user until a timeout period expires. As such, if a user enters and exits the geo-fence before the timeout period expires, the user is not presented with the notification, which is likely irrelevant to the user having passed out of the geo-fence. This particular "annoyance-avoidance" mechanism is important. Implementing a delay (which can be a configurable amount of time), uses a buffer to store alerts/notifications before being presented to the user. By leveraging a delay capability, the buffer will remove many of the unwanted alerts, which are often just ignored by the user.

In addition to geo-fence notifications that provide information, a geo-fence notification may provide a mechanism to download, install, or launch an application. The application may be stored local to the user device or remote from the user device. The mechanism to download, install, or launch the application may include use of a hyperlink, remote procedure call, or other mechanism to initiate the download, installation, or execution. Once an application is available on a user device, it may be included along with other applications. Further, the user may not be apprised of whether the application is active. For example, some applications may be designed to only work within a certain geo-fence. Thus, when outside of the geo-fence, the application is not useful and may not even operate.

Alone or in combination with the previously discussed delay mechanism, a geo-fence-aware application folder may also be used to present applications in a location-based context. A geo-fence-aware application folder is a folder that dynamically changes its contents based on which geo-fence applications are active. When a user device enters a geo-fence with an application, the application is identified and an application icon is presented in the geo-fence-aware application folder. By using a folder with a geo-fence filter on it, the user is provided specific, relevant, and timely information in a compact and organized form. As discussed above, the concept of a geo-fence-aware folder may be combined with a delay mechanism, such that an application is not presented in the folder until a timeout period expires. Further details of both the geo-fence-aware folder and the delay mechanism are provided below.

FIG. 1 is a schematic drawing illustrating a geo-fence system 100, according to an embodiment. The geo-fence system 100 includes a mobile device 102 and a geo-fence server system 104, which are connected over a network 106. While the geo-fence server system 104 is illustrated as a single machine in FIG. 1, in various embodiments, the geo-fence server system 104 may comprise multiple servers working together (e.g., colocated, distributed, or as a cloud-based system).

The mobile device 102 may be devices such as a smartphone, cellular telephone, mobile phone, laptop computer, tablet computer, Ultrabook®, in-vehicle computer, or other portable networked device. In general, the mobile device 102 is small and light enough to be considered portable (e.g., carried by a person) or is attached or incorporated into mobile equipment (e.g., an automobile in-dash system, a golf cart navigation system, etc.). In addition, the mobile device 100 generally includes a mechanism to connect to the network 106, either over a persistent or intermittent connection. The mobile device 102 may include a geo-location module 108 and a presentation module 110. The geo-location module 108 may periodically, continuously, or regularly obtain a user's location. In an embodiment, the user's location is determined with technologies such as global positioning system (GPS), radio frequency triangulation, or other location aware services. The geo-location module 108 may communicate with the geo-fence server system 104 (e.g., a cloud-based service) to obtain the location of the mobile device 102. The mobile device 102 may be capable of transmitting and receiving wireless signals using various technologies. Examples of wireless technologies include, but are not limited to Bluetooth™, Wi-Fi®, cellular, radio-frequency identification (RFID), WiMAX®, and the like.

In operation, a user may operate a mobile device 102 while travelling. The mobile device 102 periodically or recurrently determines its position (e.g., latitude/longitude ("lat/long") or UTM position) and transmits the position to the geo-fence server system 104. In response, the geo-fence server system 104 determines whether the mobile device 102 is within a geo-fence. If so, the geo-fence server system 104 transmits details of the geo-fence or geo-fences that the mobile device 102 is within. The polling interval, the interval between queries from the mobile device 102 to the geo-fence server system 104, is configurable in some embodiments. In an embodiment, the polling interval is equal to the timeout period. Thus, for example, a polling interval may be configured to be two minutes. So, every two minutes the mobile device 102 transmits the position to the geo-fence server system 104 with an express or implied request for relevant geo-fence information. When a geo-fence is identified and returned to the mobile device 102, the mobile device 102 delays for two minutes (e.g., the polling period) before presenting the notification associated with the geo-fence. After two minutes, the mobile device 102 again transmits its position. If the mobile device 102 is still in the geo-fence, then the mobile device 102 provides the notification to the user.

In an embodiment, the geo-location module 108 determines a geographical location of the mobile device and determines whether the mobile device is located in a geo-fenced area for longer than a threshold period of time. The presentation module 110 may then present a notification on the mobile device when the mobile device is located in the geo-fenced area for longer than the threshold period of time.

In another example operation, when a user with a mobile device 102 enters a geo-fence (as determined by polling the geo-fence server system 104), a geo-fence application folder is populated with an application specific to the geo-fence. After the user exits the geo-fence, the application is disabled or deleted.

Figure 2:
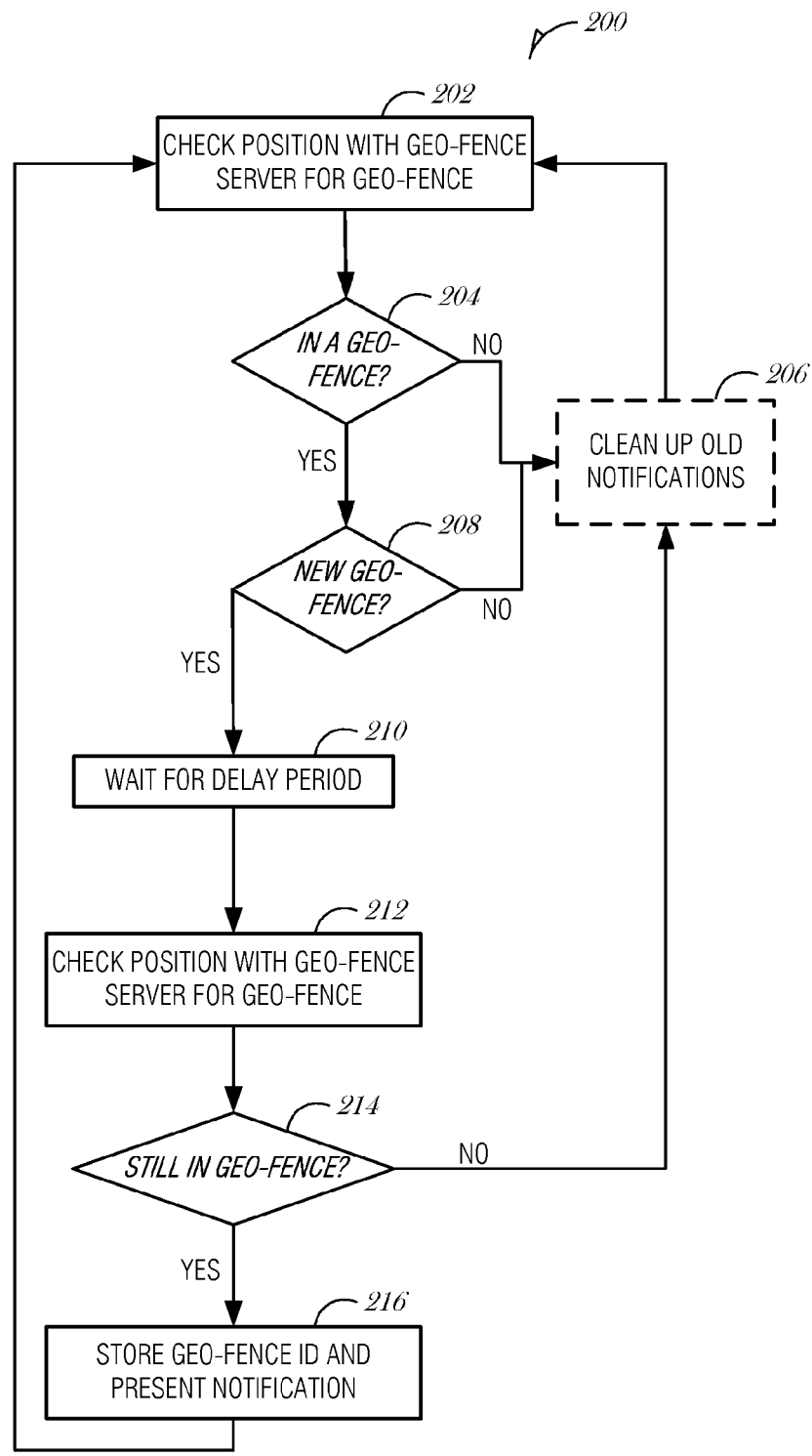
FIG. 2 is a control flow diagram illustrating the operation of a delay mechanism, according to an embodiment.

FIG. 2 is a control flow diagram 200 illustrating the operation of a delay mechanism, according to an embodiment. At block 202, a mobile device's position (e.g., lat/long or UTM position) is obtained and transmitted to a geo-fence server (e.g., geo-fence server system 104). The geo-fence server has access to a database of geo-fences and corresponding coordinates. Using various techniques, the geo-fence server is able to determine whether the provided position is within one or more geo-fences.

At decision block 204, the mobile device receives data from the geo-fence server indicating whether the mobile device is in a geo-fence. If the mobile device is in a geo-fence, then the control flow continues to decision block 208. If the mobile device is not in a geo-fence, then at block 206, the mobile device may optionally clean up any old notifications and the control flow returns to block 202. For example, after a mobile device has left a geo-fence, the notifications that may have been buffered or queued to present to the user of the mobile device may no longer be relevant. As such, removing the old notifications (block 206) reduces or eliminates irrelevant notifications from the user view. In some cases, notifications associated with a geo-fence may be flagged so that they are not removed at block 206. For example, a clothing store may want to present a notification of a sale when a user exits the store's geo-fence. The notification may include a coupon or other advertisement in an effort to entice the user to return to the area and shop.

At decision block 208, a geo-fence identification ("ID") provided by the geo-fence server to the mobile device is accessed, and the mobile device determines whether it is a new geo-fence (e.g., one that the device was not previously-determined to be within). If the geo-fence is not new to the device, then at block 206, the mobile device may optionally clean up any old notifications and the return to block 202 to poll the geo-fence server again at the next polling time.

If the geo-fence is considered new, then at block 210 the mobile device delays for a delay period. The delay period may be configurable. In an embodiment, the delay period and the polling period are the same, such that when a user configures a delay period, the delay period is used as the polling period or vice versa. In various embodiments, the delay period may be specific to a geo-fence. For example, as a user enters a first geo-fence, the delay period may begin to toll. However, while in the first geo-fence, if the user enters a second geo-fence, then a second delay period may begin to toll against the second geo-fence. Thus, if the time between entering the first and second geo-fences was 45 seconds, then the notifications may be spaced approximately 45 seconds apart (due to the independent delay periods expiring at approximately 45 seconds from each other). While some of the examples described herein refer to a single geo-fence, it is understood that control flows or other mechanism may be applied to overlapping, or intersecting geo-fences asynchronously.

At block 212, after the delay period expires, the mobile device again polls the geo-fence server to determine whether the mobile device continues to be within the new geo-fence. The delay period may be configurable, such as by a user-selected value. At decision block 214, the determination is made whether the device is still in the geo-fence. If the mobile device has moved out of the new geo-fence, then control flows back to optional block 206 and eventually back to starting block 202 to poll the geo-fence server again. If on the other hand, the mobile device is still within the geo-fence, then various actions may be taken according to the attributes or functions associated with the geo-fence (e.g., present notification, present coupon, download application, activate application, etc.). After block 216 is processed, control flows back to the initial block 202. Once the notifications for a geo-fence have been processed (e.g., at block 214), additional notifications from the geo-fence are disabled so as to avoid providing multiple or duplicative notifications to the user.

In the control flow diagram 200, it is understood that the control flow may run asynchronously. For example, the position check at block 202 may be performed repeatedly, periodically, or regularly, such as at one second intervals. If a new geo-fence is found at decision block 208, then additional control occurs (e.g., delay and notification). However, concurrently another position check may be performed at block 202. Using a repeating position check provides the control flow in FIG. 2 the ability to handle overlapping or intersecting geo-fences.

Figure 3:
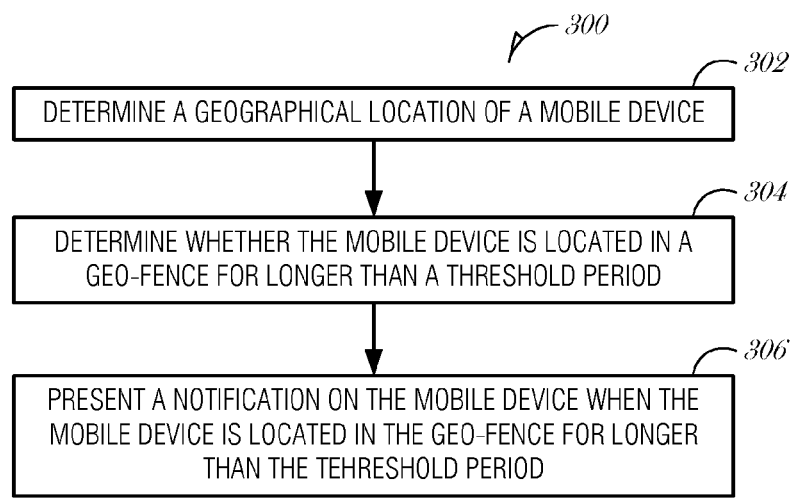
FIG. 3 is flow diagram illustrating a method for presenting a notification, according to an embodiment.

FIG. 3 is flow diagram illustrating a method 300 for presenting a notification, according to an embodiment. At block 302, a geographical location of the mobile device is determined. The geographical location is determined at the mobile device. Geographical location may be determined in various ways including Global Positioning Systems (GPS), assisted GPS, cellular triangulation, or Wi-Fi triangulation. The result of such positioning systems may be reduced to a latitude/longitude pair. Thus, in an embodiment, the geographical location includes latitude and longitude coordinates. In another embodiment, the geographical location includes a UTM position, which includes a UTM zone number and an easting and northing coordinate pair for the UTM zone associated with the UTM zone number.

At block 304, whether the mobile device is located in a geo-fenced area for longer than a threshold period of time is determined. In an embodiment, the threshold period is configurable. The threshold may be configured by a user of the mobile device. As such, configuring the threshold period may include receiving a value at the mobile device and saving the value as the threshold value. The threshold value may be saved on the mobile device or remote from the threshold device.

To determine whether the mobile device has entered a geo-fenced area, the mobile device may communicate with a server (e.g., geo-fence server). In an embodiment, the mobile device transmits the geographical location to a server and receives an indication from the server that the mobile device is in the geo-fenced area.

To determine whether the threshold period has expired, the mobile device may use a timer. Thus, after determining that the mobile device has entered the geo-fenced area, the mobile device may initiate a timer to track the amount of time the mobile device is in the geo-fenced area.

The threshold period may be measured in second, minutes, or any other measurement of time. The threshold may be presented to the user as a subjective measurement, such as short, medium, or long delay and correlate to predetermined periods (e.g., two seconds, 5 seconds, and 15 seconds).

In various embodiments, the threshold period may be specific to the geo-fenced area. For example, one geo-fenced area may have a short threshold period while another geo-fenced area may have a longer threshold period. In another embodiment, a single threshold period is used for all geo-fenced areas encountered. In various embodiments, the threshold period may be effected by contextual data, such as the time of day, a user's activities, or other information.

At block 306, a notification is presented on the mobile device when the mobile device is located in the geo-fenced area for longer than the threshold period of time. As discussed above, notifications may include a textual notification along with other data, such as a Uniform Resource Link (URL) to a web page or other asset. Thus, in embodiments, the notification includes a link to one of: an advertisement, a coupon, an application, a map, or a document. Other types of information, such as reminders, alerts, or warnings are encompassed in the scope of a notification. Additionally, the notification may be a personalized message, such as targeted advertising, a message to the user from another user or business, or a reminder left by the user to be presented upon reentering the geo-fence.

An advertisement may be of various forms, such as a visual advertisement (to mimic a print ad), a video, a slideshow, or other multimedia content. A coupon may be represented in various ways, such as with a bar code (e.g., linear bar code, 3D bar code, QR code, etc.), or a coupon code. An application may be a widget, script, app, or other type of executable code, whether executable at the mobile device or remote from the mobile device. The link to the application may be a link to an application store or repository (e.g., Apple® App Store™ or Android™ Google Play™), where the user may download and install the application. Alternatively, the notification may link to an application previously installed on the mobile device and accessing or activating a portion of the notification may execute the application from the mobile device.

After presenting the notification (after being in the geo-fenced area for longer than the threshold period), in an embodiment, the method 300 suppresses further notifications from the geo-fence. For example, after a user has acknowledged and dismissed a notification, additional notifications or different notifications from the geo-fence are suppressed. This avoids providing redundant or irritating information to the user.

In an embodiment, an indication that an application is available for use or download is presented when the mobile device is located in the geo-fenced area for longer than the threshold period of time. This is an implementation of the geo-fence-aware application folder described above. The indication may be provided in various manners. In an embodiment, the indication that the application is available is presented in a notification area. In another embodiment, the indication that the application is available is presented as an emblem on an icon.

Figure 4:
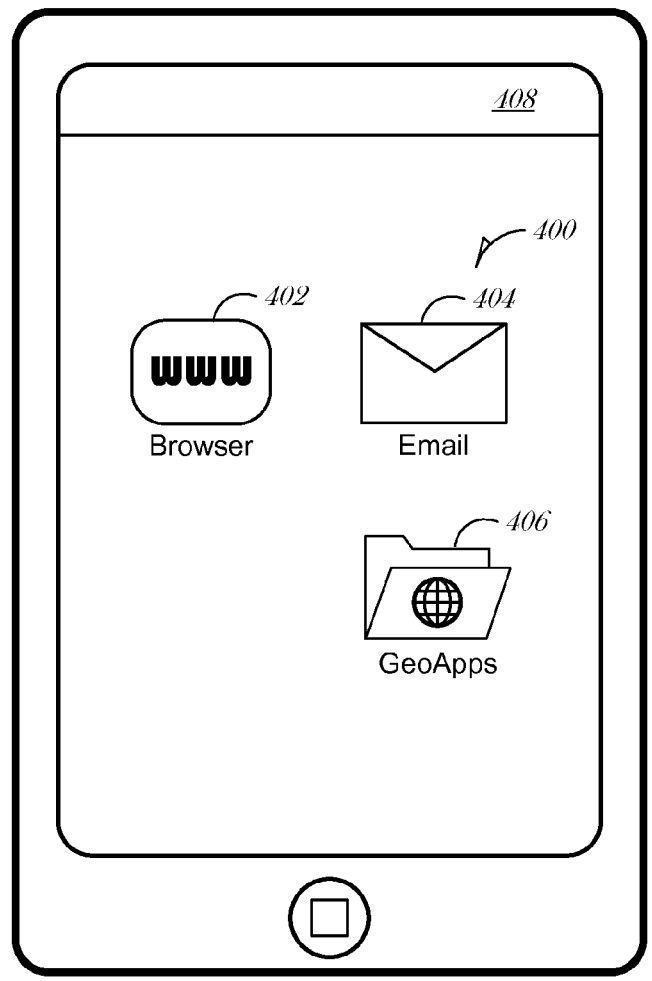
FIG. 4 is a schematic diagram illustrating a user interface according to an embodiment.

FIG. 4 is a schematic diagram illustrating a user interface 400 according to an embodiment. The user interface 400 includes multiple icons, including a browser icon 402, a mail icon 404, and a geo-fence-aware application folder icon 406. It is understood that more or fewer icons may be presented on the user interface 400. In addition to the icons, the user interface 400 includes a notification bar 408. The notification bar 408 is used to present a notification. The notification may be presented in various ways, such as using a miniature icon, text display, scrolling text, flashing the notification bar 408, or other mechanisms to attract attention or convey information.

Figure 5:
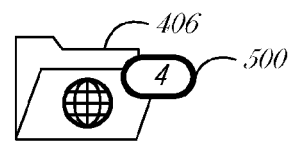
FIG. 5 illustrates an example of a dynamic emblem, according to an embodiment.

In operation, when a user enters a geo-fenced area, the mobile device is notified by a server (e.g., geo-fence server system) that the geo-fence has an associated application. In addition to or instead of providing a notification in the notification bar 408, a folder emblem may be used to embellish the geo-fence-aware application folder icon 406. Emblems may also be referred to as decorations, badges, frills, or other auxiliary graphic. To notify a user of the existence of one or more applications available for use or download, the folder emblem may be dynamic in nature, such as by presenting a number of available applications. An example of a dynamic emblem 500 is illustrated in FIG. 5. The emblem 500 notifies the user that four new applications are available in the geo-fence-aware application folder. The four new applications may be associated with one or more geo-fences that the mobile device has entered.

Figure 6:
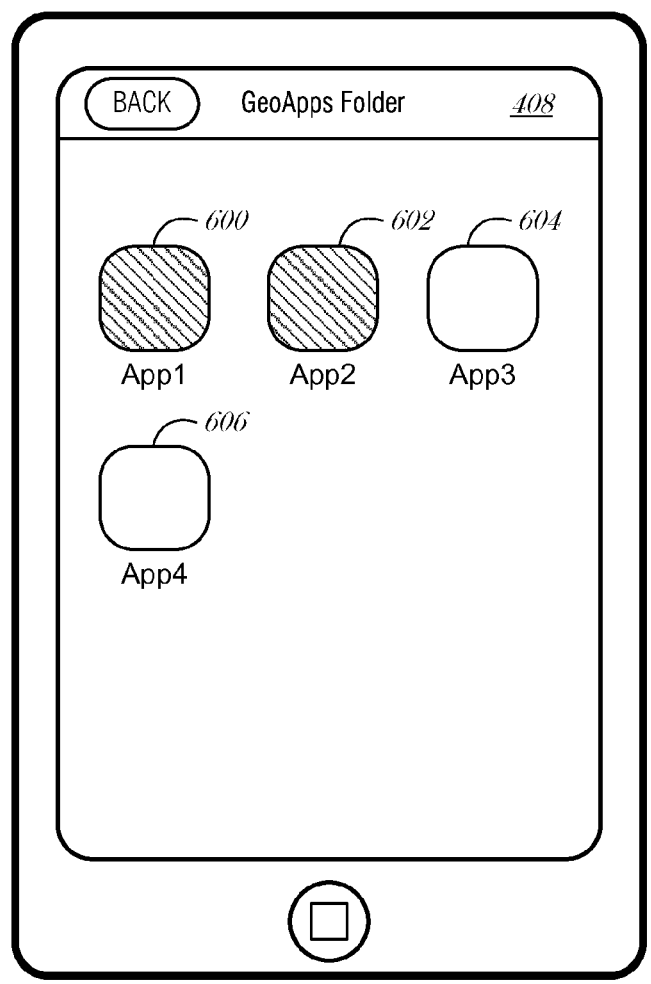
FIG. 6 is an illustration of a geo-fence-aware application folder's contents, according to an embodiment.

FIG. 6 is an illustration of a geo-fence-aware application folder's contents, according to an embodiment. In the example depicted, application icons are displayed as "greyed out" unless they are installed. When a user touches the grey application icon, the device initiates the install process. Applications that are not greyed out are ready for execution. Such applications may have been previously installed, such as during the user's last visit to the geo-fenced area, or may be native applications installed on the mobile device. In the example depicted in FIG. 6, applications 600 and 602 are greyed out while applications 604 and 606 are active and ready to execute. If the user selects a greyed out application icon 600, 602, they will be taken to an application store to install the application. Once the application is installed, the appropriate icon changes to a full color icon.

In the case where there are no applications associated with a geo-fence, the geo-fence-aware folder 406 may be empty (e.g., no icons present) or may display an informational message (e.g., "No applications in this location").

Some geo-fence applications may be permanently loaded on the phone. In this case, the application is always on the user's desktop once loaded. But when in a geo-fence for that application, the application (or a pointer to it) is placed in the geo-fence-aware folder 406 for easy locating.

Another function is to "ban" an application from appearing (creating a type of blacklist of applications). For example, after a user is presented with an application icon in the geo-fence-aware folder 406, the user may interact with the user interface and remove the application from the folder 406 and indicate that they do not want further notifications of this application. In some embodiments, this allows a user to decline seeing future notifications for a particular application in all geo-fences.

Another function is to allow a user to "Temporarily install an application" while still in the valid geo-fence. In this situation, once the user leaves that geo-fence, the application "uninstall" process is started. In an embodiment, the uninstall process awaits user confirmation to continue with the uninstallation. The user may be notified via the notification bar 408 of an application that is no longer relevant and whether to uninstall the application.

Figure 7:
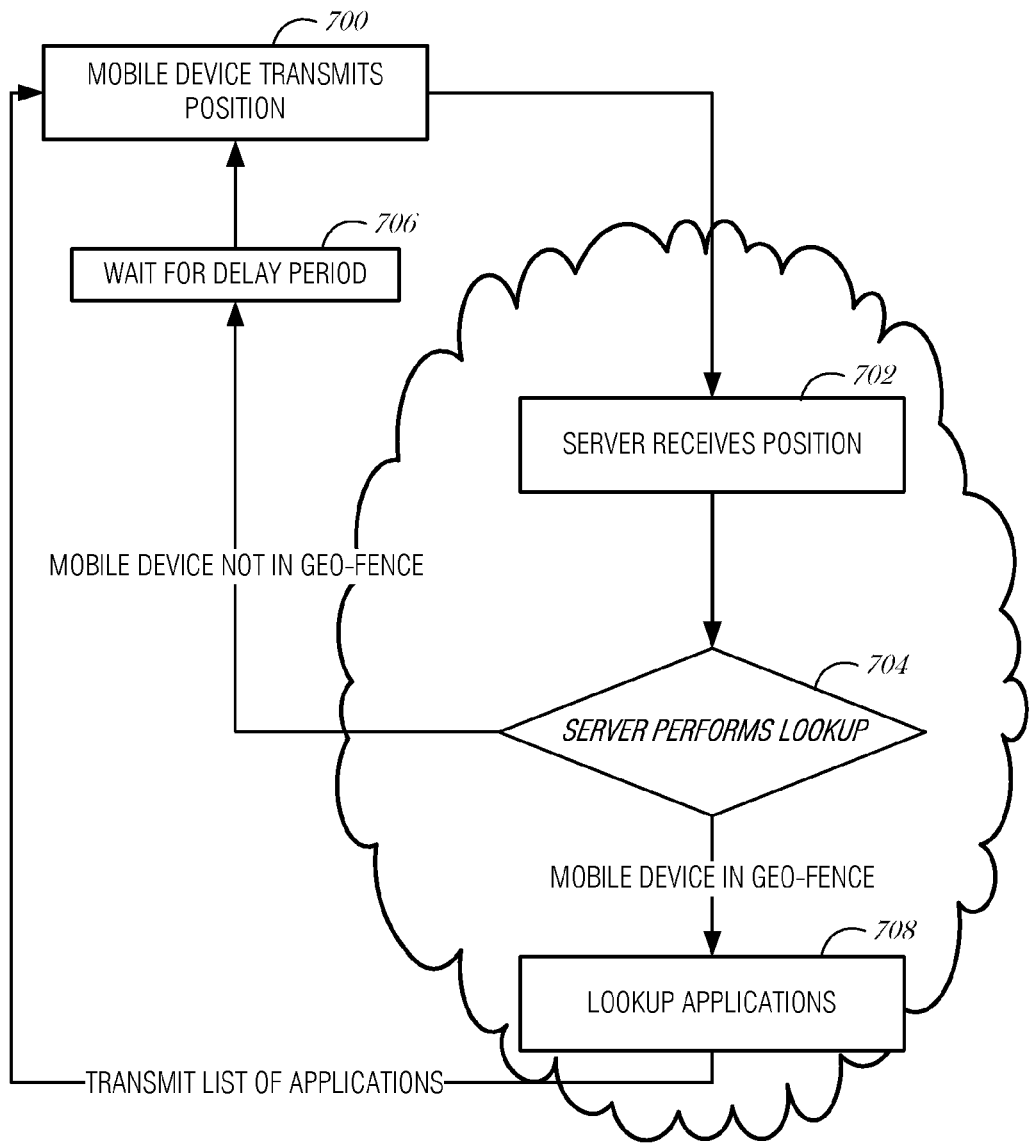
FIG. 7 is a control flow diagram illustrating geo-fence application notification, according to an embodiment.

FIG. 7 is a control flow diagram illustrating geo-fence application notification, according to an embodiment. At block 700, a mobile device transmits its position (e.g., lat/long or UTM position) to a server. At block 702, the server receives the position and performs a lookup (block 704) to determine whether the mobile device is in a geo-fence. If the mobile device is not in a geo-fence, then the server does not respond. At block 706, a delay is initiated (e.g., a polling delay) before the mobile device transmits its position again. If the mobile device is found to be in a geo-fence, then the server looks up any associated applications (block 708) and if any are found, transmits a list to the mobile device. The message including the list may be in a standardized format, such as XML, JSON (JavaScript Object Notation), or another data structure. Defining a geo-fence and the associated content with that geo-fence may be managed on a server in the cloud.

Figure 8:
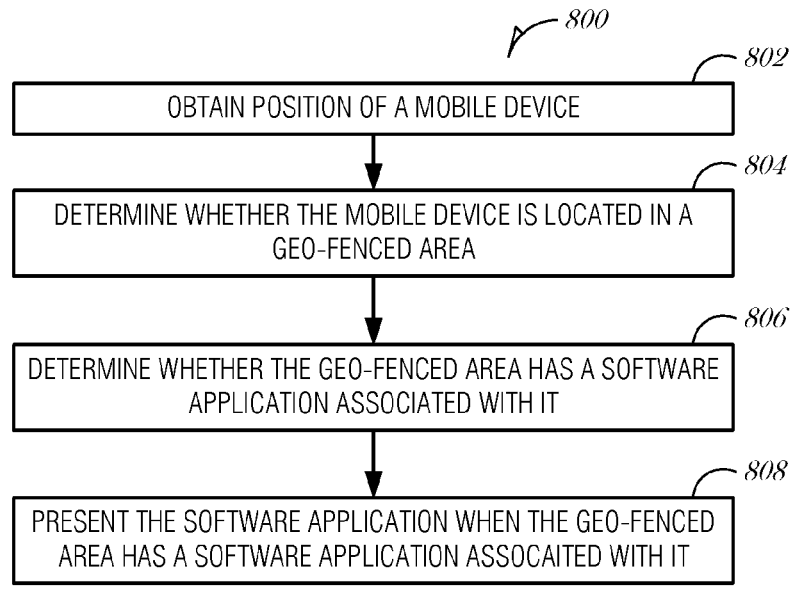
FIG. 8 is a flow diagram illustrating a method for presenting an application, according to an embodiment.

FIG. 8 is a flow diagram illustrating a method 800 for presenting an application, according to an embodiment. At 802, a position of a mobile device is obtained at a server. The position may be obtained by various means, including Global Positioning System (GPS), assisted GPS, cellular triangulation, or Wi-Fi triangulation. From these various means, a latitude and longitude may be derived. Thus, in an embodiment, the position is a latitude and longitude position.

At 804, whether the mobile device is located in a geo-fenced area is determined.

At 806, whether the geo-fenced area has a software application associated with it is determined To determine whether the geo-fenced area has a software application associated with it, the server may obtain a geo-fence identifier (e.g., unique identifier) and query a database with the geo-fence identifier. The database may include a relationship between geo-fence identifiers and software applications. The response to the query may be a result set that includes a record with the geo-fence identifier and any software applications associated with the geo-fence identifier, where the software applications may be identified with a software application identifier. The software application identifier may be a unique identifier (e.g., globally unique identifier (GUID)), a software version, a software title, or some combination.

At 808, the software application is presented to the mobile device when the geo-fenced area has a software application associated with it. For example, the application may be installed, executed, or indicated as being available for installation or execution. Thus, in an embodiment, presenting the application includes transmitting a list including the software application to the device for presentation. The list may include the geo-fence identifier and the software application identifier, according to an embodiment. The list may be formatted in a standardized format, such as XML or JSON, in various embodiments.

The mobile device may present the software application in various ways, such as in a geo-centric application folder (e.g., FIGS. 4-6). Thus, in an embodiment, the mobile device presents the software application in a folder dedicated for geo-centric software applications.

Figure 9:
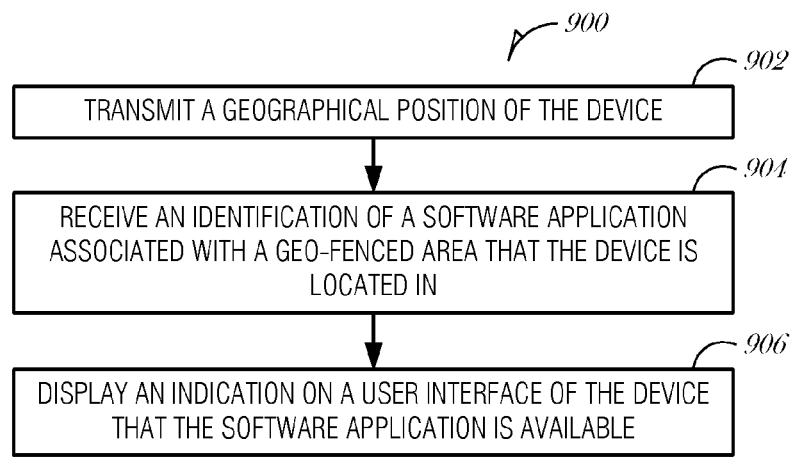
FIG. 9 is a flow diagram illustrating a method for presenting an application, according to an embodiment.

FIG. 9 is a flow diagram illustrating a method 900 for presenting an application, according to an embodiment. At 902, a geographical position of the device is transmitted from the device to a geo-fence server.

At 904, an identification of a software application associated with a geo-fenced area that the device is located in is received.

At 906, an indication is displayed on a user interface of the device that the software application is available. In an embodiment, displaying the indication that the software application is available includes displaying a notification in a notification bar of the user interface. In an embodiment, displaying the indication that the software application is available includes displaying an emblem on a folder icon, the folder icon related to a file system directory for geo-centric applications. In an embodiment, the emblem includes a numeral, the numeral indicating a number of geo-centric applications associated with the geo-fenced area.

As discussed above with reference to FIGS. 2 and 3, a delay mechanism may be used to avoid presenting unnecessary or irrelevant notifications to the user. Thus, in an embodiment, the method 900 includes delaying for a timeout period before displaying the indication on the user interface that the software application is available. In an embodiment, the timeout period is configurable by a user of the device.

After a user is presented with the notification that the software application is available, the user may navigate to a geo-centric application folder where one or more applications may be presented as active or inactive. An inactive application may be presented in a manner to indicate to the user that the application is available, but not installed yet (e.g., greyed out). Thus, in an embodiment, the method 900 includes receiving a user input to install the software application and installing the software application. It is understood that a user may be presented the option to install the application from a notification (e.g., a notification presented in the notification bar).

Installing the software application may include navigating the user to an application store and installing the software application from the application store. Application stores include software repositories such as Apple® App Store™ or Android™ Google Play™.

As a mobile device moves through geographic regions, applications installed on the device may no longer be relevant or accessible. As such, in some embodiments the software application may be automatically or semi-automatically uninstalled from the mobile device. Thus, in an embodiment, the method 900 includes transmitting from the device to the geo-fence server, an updated position of the device and receiving an indication that the device has exited the geo-fenced area. Based on this information, the mobile device may initiate an uninstallation process of the application from the device. In some cases, it is not desirable to remove an application without the user's consent or knowledge, so in an embodiment, the method 900 includes prompting a user of the device whether to uninstall the software application from the device and upon receiving a confirmation from the user, uninstalling the software application from the device.

Hardware Platform

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 10:
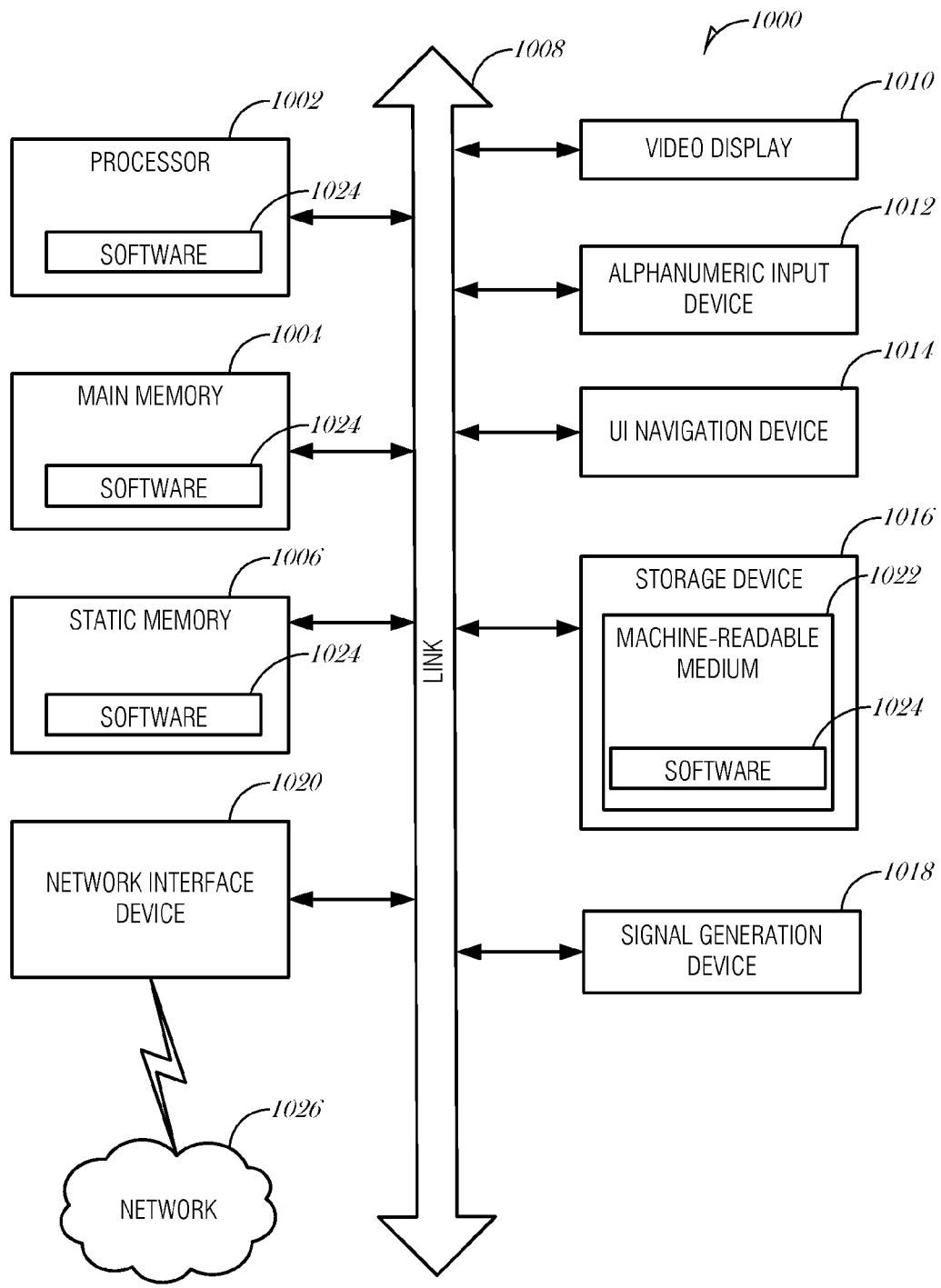
FIG. 10 is a block diagram illustrating an example machine upon which any one or more of the techniques (e.g., methodologies) discussed herein may perform, according to an example embodiment.

FIG. 10 is a block diagram illustrating a machine in the example form of a computer system 1000, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 1000 includes at least one processor 1002 (e.g., a central processing unit (CPU), a graphics processing unit (GPU) or both, processor cores, compute nodes, etc.), a main memory 1004 and a static memory 1006, which communicate with each other via a link 1008 (e.g., bus). The computer system 1000 may further include a video display unit 1010, an alphanumeric input device 1012 (e.g., a keyboard), and a user interface (UI) navigation device 1014 (e.g., a mouse). In one embodiment, the video display unit 1010, input device 1012 and UI navigation device 1014 are incorporated into a touch screen display. The computer system 1000 may additionally include a storage device 1016 (e.g., a drive unit), a signal generation device 1018 (e.g., a speaker), a network interface device 1020, and one or more sensors (not shown), such as a global positioning system (GPS) sensor, compass, accelerometer, or other sensor.

The storage device 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004, static memory 1006, and/or within the processor 1002 during execution thereof by the computer system 1000, with the main memory 1004, static memory 1006, and the processor 1002 also constituting machine-readable media.

While the machine-readable medium 1022 is illustrated in an example embodiment to be a single medium, the term "machine-readable medium" may include a single medium or multiple media (e.g., a centralized or distributed database, and/or associated caches and servers) that store the one or more instructions 1024. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 includes subject matter for geo-fence notification management (such as a device, apparatus, or machine) comprising a geo-location module communicatively coupled to the mobile device, the geo-location module to: determine a geographical location of the mobile device; and determine whether the mobile device is located in a geo-fenced area for longer than a threshold period of time; and a presentation module communicatively coupled to the mobile device, the presentation module to present a notification on the mobile device when the mobile device is located in the geo-fenced area for longer than the threshold period of time.

In Example 2, the subject matter of Example 1 may optionally include, wherein the threshold period is configurable, and wherein the geo-location module is to: receive a value at the mobile device; and save the value as the threshold value.

In Example 3 the subject matter of any one or more of Examples 1 to 2 may optionally include, wherein the notification includes a link to one of: an advertisement, a coupon, an application, a map, or a document.

In Example 4 the subject matter of any one or more of Examples 1 to 3 may optionally include, wherein the geo-location module is to: determine that the mobile device has entered the geo-fenced area; and initiate a timer to track the amount of time the mobile device is in the geo-fenced area.

In Example 5 the subject matter of any one or more of Examples 1 to 4 may optionally include, wherein determining that the mobile device has entered the geo-fenced area comprises: transmitting the geographical location to a server; and receiving an indication from the server that the mobile device is in the geo-fenced area.

In Example 6 the subject matter of any one or more of Examples 1 to 5 may optionally include, wherein the presentation module is to: suppress further notifications from the geo-fence after the mobile device has been located in the geo-fence area for longer than the threshold period of time.

In Example 7 the subject matter of any one or more of Examples 1 to 6 may optionally include, wherein the presentation module is to: present an indication that an application is available for use or download when the mobile device is located in the geo-fenced area for longer than the threshold period of time.

In Example 8 the subject matter of any one or more of Examples 1 to 7 may optionally include, wherein the indication that the application is available is presented in a notification area.

In Example 9 the subject matter of any one or more of Examples 1 to 8 may optionally include, wherein the indication that the application is available is presented as an emblem on an icon.

In Example 10 the subject matter of any one or more of Examples 1 to 9 may optionally include, wherein the icon is a folder icon.

Example 11 includes or may optionally be combined with the subject matter of any one of Examples 1-10 to include subject matter (such as a device, apparatus, or machine) comprising a server for providing geo-specific applications, the server comprising: a geo-fence location module communicatively coupled to the server, the geo-fence location module to: obtain a position of a mobile device; determine whether the mobile device is located in a geo-fenced area; determine whether the geo-fenced area has a software application associated with it; and present the software application to the mobile device when the geo-fenced area has a software application associated with it.

In Example 12, the subject matter of Example 11 may optionally include, wherein determining whether the geo-fenced area has a software application associated with it comprises: obtaining a geo-fence identifier; querying a database with the geo-fence identifier, the database including a relationship between geo-fence identifiers and software applications; and receiving a result set from the database, the result set including a record including the geo-fence identifier and a software application identifier.

In Example 13 the subject matter of any one or more of Examples 11 to 12 may optionally include, wherein presenting the application comprises: transmitting a list including the software application to the device for presentation.

In Example 14 the subject matter of any one or more of Examples 11 to 13 may optionally include, wherein the list includes the geo-fence identifier and the software application identifier.

In Example 15 the subject matter of any one or more of Examples 11 to 14 may optionally include, wherein the list is formatted in a standardized format.

In Example 16 the subject matter of any one or more of Examples 11 to 15 may optionally include, wherein the standardized format includes XML.

In Example 17 the subject matter of any one or more of Examples 11 to 16 may optionally include, wherein the standardized format includes JSON.

In Example 18 the subject matter of any one or more of Examples 11 to 17 may optionally include, wherein the mobile device presents the software application in a folder dedicated for geo-centric software applications.

Example 19 includes or may optionally be combined with the subject matter of any one of Examples 1-18 to include subject matter (such as a device, apparatus, or machine) comprising a device for displaying geo-centric applications, comprising a transceiver module communicatively coupled to the device, the transceiver module to: transmit from the device to a geo-fence server, a geographical position of the device; and receive an identification of a software application associated with a geo-fenced area that the device is located in; and a presentation module communicatively coupled to the device, the presentation module to display an indication on a user interface of the device that the software application is available.

In Example 20, the subject matter of Example 19 may optionally include, wherein to display the indication that the software application is available, the presentation module is to: display a notification in a notification bar of the user interface.

In Example 21 the subject matter of any one or more of Examples 19 to 20 may optionally include, wherein to display the indication that the software application is available, the presentation module is to: display an emblem on a folder icon, the folder icon related to a file system directory for geo-centric applications.

In Example 22 the subject matter of any one or more of Examples 19 to 21 may optionally include, wherein the emblem includes a numeral, the numeral indicating a number of geo-centric applications associated with the geo-fenced area.

In Example 23 the subject matter of any one or more of Examples 19 to 22 may optionally include, wherein the presentation module is to: delay for a timeout period before displaying the indication on the user interface that the software application is available.

In Example 24 the subject matter of any one or more of Examples 19 to 23 may optionally include, wherein the timeout period is configurable by a user of the device.

In Example 25 the subject matter of any one or more of Examples 19 to 24 may optionally include, comprising an application module to: receive a user input to install the software application; and install the software application.

In Example 26 the subject matter of any one or more of Examples 19 to 25 may optionally include, wherein to install the software application, the application module is to: navigate the user to an application store; and install the software application from the application store.

In Example 27 the subject matter of any one or more of Examples 19 to 26 may optionally include, wherein the transceiver is to: transmit from the device to the geo-fence server, an updated position of the device; and receive an indication that the device has exited the geo-fenced area; and wherein the application module is to initiate an uninstallation process of the application from the device.

In Example 28 the subject matter of any one or more of Examples 19 to 27 may optionally include, wherein the application module is to: prompt a user of the device whether to uninstall the software application from the device; and upon receiving a confirmation from the user, uninstall the software application from the device.

Example 29 includes or may optionally be combined with the subject matter of any one of Examples 1-28 to include subject matter for geo-fence notification management (such as a method, means for performing acts, machine readable medium including instructions that when performed by a machine cause the machine to performs acts, or an apparatus configured to perform) comprising determining at a mobile device, a geographical location of the mobile device; determining whether the mobile device is located in a geo-fenced area for longer than a threshold period of time; and presenting a notification on the mobile device when the mobile device is located in the geo-fenced area for longer than the threshold period of time.

In Example 30, the subject matter of Example 29 may optionally include, wherein the threshold period is configurable, and wherein the method comprises: receiving a value at the mobile device; and saving the value as the threshold value.

In Example 31 the subject matter of any one or more of Examples 29 to 30 may optionally include, wherein the notification includes a link to one of: an advertisement, a coupon, an application, a map, or a document.

In Example 32 the subject matter of any one or more of Examples 29 to 31 may optionally include, determining that the mobile device has entered the geo-fenced area; and initiating a timer to track the amount of time the mobile device is in the geo-fenced area.

In Example 33 the subject matter of any one or more of Examples 29 to 32 may optionally include, wherein determining that the mobile device has entered the geo-fenced area comprises: transmitting the geographical location to a server; and receiving an indication from the server that the mobile device is in the geo-fenced area.

In Example 34 the subject matter of any one or more of Examples 29 to 33 may optionally include, suppressing further notifications from the geo-fence after the mobile device has been located in the geo-fence area for longer than the threshold period of time.

In Example 35 the subject matter of any one or more of Examples 29 to 34 may optionally include, presenting an indication that an application is available for use or download when the mobile device is located in the geo-fenced area for longer than the threshold period of time.

In Example 36 the subject matter of any one or more of Examples 29 to 35 may optionally include, wherein the indication that the application is available is presented in a notification area.

In Example 37 the subject matter of any one or more of Examples 29 to 36 may optionally include, wherein the indication that the application is available is presented as an emblem on an icon.

In Example 38 the subject matter of any one or more of Examples 29 to 37 may optionally include, wherein the icon is a folder icon.

Example 39 includes or may optionally be combined with the subject matter of any one of Examples 1-38 to include subject matter for providing geo-specific applications (such as a method, means for performing acts, machine readable medium including instructions that when performed by a machine cause the machine to performs acts, or an apparatus configured to perform) comprising obtaining at a server system, a position of a mobile device; determining whether the mobile device is located in a geo-fenced area; determining whether the geo-fenced area has a software application associated with it; and presenting the software application to the mobile device when the geo-fenced area has a software application associated with it.

In Example 40, the subject matter of Example 39 may optionally include, wherein determining whether the geo-fenced area has a software application associated with it comprises: obtaining a geo-fence identifier; querying a database with the geo-fence identifier, the database including a relationship between geo-fence identifiers and software applications; and receiving a result set from the database, the result set including a record including the geo-fence identifier and a software application identifier.

In Example 41 the subject matter of any one or more of Examples 39 to 40 may optionally include, wherein presenting the application comprises: transmitting a list including the software application to the device for presentation.

In Example 42 the subject matter of any one or more of Examples 39 to 41 may optionally include, wherein the list includes the geo-fence identifier and the software application identifier.

In Example 43 the subject matter of any one or more of Examples 39 to 42 may optionally include, wherein the list is formatted in a standardized format.

In Example 44 the subject matter of any one or more of Examples 39 to 43 may optionally include, wherein the standardized format includes XML.

In Example 45 the subject matter of any one or more of Examples 39 to 44 may optionally include, wherein the standardized format includes JSON.

In Example 46 the subject matter of any one or more of Examples 39 to 45 may optionally include, wherein the mobile device presents the software application in a folder dedicated for geo-centric software applications.

Example 47 includes or may optionally be combined with the subject matter of any one of Examples 1-46 to include subject matter for displaying geo-centric applications on a device (such as a method, means for performing acts, machine readable medium including instructions that when performed by a machine cause the machine to performs acts, or an apparatus configured to perform) comprising transmitting from the device to a geo-fence server, a geographical position of the device; receiving an identification of a software application associated with a geo-fenced area that the device is located in; and displaying an indication on a user interface of the device that the software application is available.

In Example 48, the subject matter of Example 47 may optionally include, wherein displaying the indication that the software application is available comprises: displaying a notification in a notification bar of the user interface.

In Example 49 the subject matter of any one or more of Examples 47 to 48 may optionally include, wherein displaying the indication that the software application is available comprises: displaying an emblem on a folder icon, the folder icon related to a file system directory for geo-centric applications.

In Example 50 the subject matter of any one or more of Examples 47 to 49 may optionally include, wherein the emblem includes a numeral, the numeral indicating a number of geo-centric applications associated with the geo-fenced area.

In Example 51 the subject matter of any one or more of Examples 47 to 50 may optionally include, delaying for a timeout period before displaying the indication on the user interface that the software application is available.

In Example 52 the subject matter of any one or more of Examples 47 to 51 may optionally include, wherein the timeout period is configurable by a user of the device.

In Example 53 the subject matter of any one or more of Examples 47 to 52 may optionally include, receiving a user input to install the software application; and installing the software application.

In Example 54 the subject matter of any one or more of Examples 47 to 53 may optionally include, wherein installing the software application comprises: navigating the user to an application store; and installing the software application from the application store.

In Example 55 the subject matter of any one or more of Examples 47 to 54 may optionally include, transmitting from the device to the geo-fence server, an updated position of the device; receiving an indication that the device has exited the geo-fenced area; and initiating an uninstallation process of the application from the device.

In Example 56 the subject matter of any one or more of Examples 47 to 55 may optionally include, prompting a user of the device whether to uninstall the software application from the device; and upon receiving a confirmation from the user, uninstalling the software application from the device.

Example 57 includes or may optionally be combined with the subject matter of any one of Examples 1-56 to include a machine-readable medium including instructions for anomaly detection on a web client, which when executed by a machine, cause the machine to perform operations of any one of the examples 1-56.

Example 58 includes or may optionally be combined with the subject matter of any one of Examples 1-56 to include an apparatus comprising means for performing any of the examples 1-56.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A mobile device for geo-fence notification management, the mobile device comprising:
   a geo-location module communicatively coupled to the mobile device, the geo-location module to:
   determine a geographical location of the mobile device;
   determine that the mobile device has entered a geo-fenced area;
   initiate a timer to track the amount of time the mobile device is in the geo-fenced area; and
   determine whether the mobile device is located in the geo-fenced area for longer than a threshold period of time; and
   a presentation module communicatively coupled to the mobile device, the presentation module to present a notification on the mobile device when the mobile device is located in the geo-fenced area for longer than the threshold period of time, and suppress further notifications from the geo-fence after the mobile device has been located in the geo-fence area for longer than the threshold period of time,
   wherein to determine that the mobile device has entered the geo-fenced area, the geo-location module is to periodically poll a geo-fence server using a polling period, wherein the polling period is configured by a user of the mobile device, and wherein the threshold period of time is set to the polling period after the user configures the polling period.

2. The mobile device of claim 1, wherein the threshold period is configurable, and wherein the geo-location module is to:
   receive a value at the mobile device; and
   save the value as the threshold value.

3. The mobile device of claim 1, wherein the notification includes a link to one of: an advertisement, a coupon, an application, a map, or a document.

4. The mobile device of claim 1, wherein the presentation module is to:
   present an indication that an application is available for use or download when the mobile device is located in the geo-fenced area for longer than the threshold period of time.

5. The mobile device of claim 1, wherein the indication that the application is available is presented in a notification area.

6. The mobile device of claim 1, wherein the indication that the application is available is presented as an emblem on an icon.

7. The mobile device of claim 6, wherein the icon is a folder icon.

8. A method for geo-fence notification management, the method comprising:
   determining at a mobile device, a geographical location of the mobile device;
   determining that the mobile device has entered a geo-fenced area;
   initiating a timer to track the amount of time the mobile device is in the geo-fenced area;
   determining whether the mobile device is located in the geo-fenced area for longer than a threshold period of time;

presenting a notification on the mobile device when the mobile device is located in the geo-fenced area for longer than the threshold period of time; and suppressing further notifications from the geo-fence after the mobile device has been located in the geo-fence area for longer than the threshold period of time, wherein determining that the mobile device has entered the geo-fenced area comprises periodically polling a geo-fence server using a polling period, wherein the polling period is configured by a user of the mobile device, and wherein the threshold period of time is set to the polling period after the user configures the polling period.

9. The method of claim 8, comprising:

presenting an indication that an application is available for use or download when the mobile device is located in the geo-fenced area for longer than the threshold period of time.

10. A non-transitory machine-readable medium including instructions, which when executed by a machine, cause the machine to perform operations comprising:

determining at a mobile device, a geographical location of the mobile device;

determining that the mobile device has entered a geo-fenced area by periodically polling a geo-fence server using a polling period, wherein the polling period is the same as the threshold period of time;

initiating a timer to track the amount of time the mobile device is in the geo-fenced area;

determining whether the mobile device is located in the geo-fenced area for longer than a threshold period of time;

presenting a notification on the mobile device when the mobile device is located in the geo-fenced area for longer than the threshold period of time; and suppressing further notifications from the geo-fence after the mobile device has been located in the geo-fence area for longer than the threshold period time, wherein determining that the mobile device has entered the geo-fenced area comprises periodically polling a geo-fence server using a polling period, wherein the polling period is configured by a user of the mobile device, and wherein the threshold period of time is set to the polling period after the user configures the polling period.

* * * * *

UNITED STATES PATENT AND TRADEMARK OFFICE
CERTIFICATE OF CORRECTION

PATENT NO. : 9,549,286 B2
APPLICATION NO. : 14/122040
DATED : January 17, 2017
INVENTOR(S) : Birch et al.

Page 1 of 1

It is certified that error appears in the above-identified patent and that said Letters Patent is hereby corrected as shown below:

In the Claims

In Column 20, Line 15, in Claim 10, after "period", insert --of--

Signed and Sealed this
Fourth Day of June, 2019

Andrei Iancu
*Director of the United States Patent and Trademark Office*